Jan. 17, 1928.

R. G. PACKARD, JR 1,656,496

GUN SIGHT

Filed Sept. 8, 1923      5 Sheets-Sheet 5

INVENTOR
*Ralph G. Packard Jr*
BY
*George C Ahern*
his ATTORNEY

Patented Jan. 17, 1928.

1,656,496

UNITED STATES PATENT OFFICE.

RALPH G. PACKARD, JR., OF MORRISTOWN, NEW JERSEY.

GUN SIGHT.

Application filed September 8, 1923. Serial No. 661,559.

My present invention relates more particularly to telescopic sights for rifles and many of its important features were primarily devised for their utility in connection with the employment of such sights on high power sporting and military rifles, but certain features of the invention will be found useful on rifles of the less powerful types.

Telescopes for rifle sights have been developed to a point where the problems of high-power, brilliant field and safe mounting for the lenses have been solved to such an extent that it is now entirely practicable to have such telescopes rigidly mounted on rifles even of the highest power without danger that the recoil will disarrange or cause damage to the lenses, reticule or other parts of the telescope. In such arrangements where the mount as a whole has been detachable, the primary securing means has often proved far from rigid under continuous firing of heavy charges and even where the primary attachment has been made absolutely rigid by permanently brazing it to the frame of the rifle, the value of this rigidity has been greatly impaired by the necessity for a secondary mount which is laterally adjusted for windage and drift.

An important feature of my present invention is that the tube of the telescope is non-adjustably secured in fixed relation approximately parallel with the axis of the rifle barrel, the adjustments both for range and windage being both effected without any change in the position of the telescope tube. The desired adjustments are effected, one by a vertical screw and the other by a horizontal screw moving the sight reticule within the telescope tube. I believe I am the first to have successfully combined the horizontal or windage adjustment of the reticule with the vertical adjustment and thus avoiding all adjustment of the telescope tube and making it possible to have a mount which is absolutely fixed as well as rigid.

Another feature of the invention is a detachable securing means for the mount having special adaptation whereby the attachment of the mount to the rifle frame is so tight that jar or shake of the telescope relative to the rifle is impossible, the telescope and its mount recoiling with the gun as if they were all one piece. This and also the certainty of replacing the telescope in exactly the same position every time is contributed to by avoiding the use of the converging wedge dovetail. Hence I prefer to make the dovetail elements parallel with only a straight sliding fit between the parts and I cause the wedging to take effect by direct thrust against transverse under-cut surfaces, cut in or rigid with the frame. Thus in fitting the mount to the rifle, the only particularity is to form the under-cut wedge recesses so that they extend approximately at right angles to the axis of the barrel and the dove-tails so that they extend parallel with said axis. By the use of such directly abutting wedge surfaces, the amount of motion or slide of the mount to reach absolutely rigid wedge engagement is very short. Consequently, the range of movement to be forced by the locking wedge elements is extremely short and they may be of correspondingly low pitch, so as to be of great power and positively self locking against release.

Most telescopes are attached to the receiver by some form of dovetail and all I have seen have been deficient in size of base in the attachment both in the width and length of the dovetails to obtain and hold their accuracy; especially where the fits are loose enough to make the telescope easily detachable. To obviate this defect I have two cooperating sets of dovetails, one at each end of the mounting. This includes a flat bar with projections that fit into pockets at both ends of the receiver as far apart as practicable, in this case, a little over seven inches. I have made the width about two inches, thus giving a width of base greater than the altitude which latter may be taken as distance of the telescope from the point of attachment of its mount. By thus making the base attachment about two inches in width by seven inches long, I correspondingly decrease the inaccuracy which can result from slight variations in reclamping positions when attaching and detaching the telescope without rezeroing. In discharging the rifle it recoils backward and the inertia of the telescope and its mounting tends to keep the latter stationary so by far the greatest strain on the attaching lugs is in the forward direction, that is, toward the muzzle of the gun, and this strain comes bluntly against the wedging surfaces that are at right angles to the direction of recoil.

I believe that there is also more or less of a back lash or, as you might call it, counter recoil, to the telescope following the recoil of the rifle, and by my invention this jar or back lash tendency will be deprived of effect because the powerful wedge lock means which I employ is tightened to a point where the parts are already under a rigid wedge lock stress much greater than either recoil or counter-recoil.

An entirely new feature of my invention is locating the telescope in what might be called binocular relation to the regular iron sights, that is to say, the regular sights being located so that they are in direct alignment with the user's right eye when the head is resting firmly against the stock in shooting position, the telescope is offset so that its line of sight is in corresponding relation to the left eye of the user. The convenience and practicability of such arrangement of the telescope is contributed to by the fact that these telescopes as now built do not require the sighting eye to be exactly in the axis of the telescope tube and the eye piece being rather large, an average position of the telescope will afford binocular fit of the two sets of sights for different users having quite different distances between the eyes as well as different fits of cheek and jaw against the stock. The average lateral offset of the telescope required to bring the left eye in exact alignment with the axis of the telescope is likely to be about 2⅛ inches from the axis of the barrel and 1¼ inches above said axis. This position gives ample room for operating the bolt to load and unload and does not interfere with the use of the usual clip for loading.

It is not necessary to have the two sets of sights exactly binocular for the further reason that with a properly shaped stock, a correct position for the telescope can be attained, such that when using the left eye a slight shift of the head can be made and still have it steadied, and supported against the stock as well as it is now when using the right eye for the open sights. Some objection may be raised when the left eye has not been trained in aiming as the right eye has but practical experience shows that training is not required of the eye itself in aiming provided the vision of the left eye is as equally good as that of the right eye and for an ordinary marksman the only training required is the recollection to use the left eye with the telescope instead of trying to shift the right eye over to the left eye position.

Thus I find that it is entirely practical to use the left eye with the head properly steadied and supported by the stock as usual when using the open sights, and with the further advantage that the bolt can be operated without interference, the magazine can be charged in the usual manner with or without a clip, and either the telescope or the open sights can be used at will without the removal of either.

The above and other features of my invention may be more fully understood from the following description in connection with the accompanying drawings, in which.

Figures 1, 3, 4:
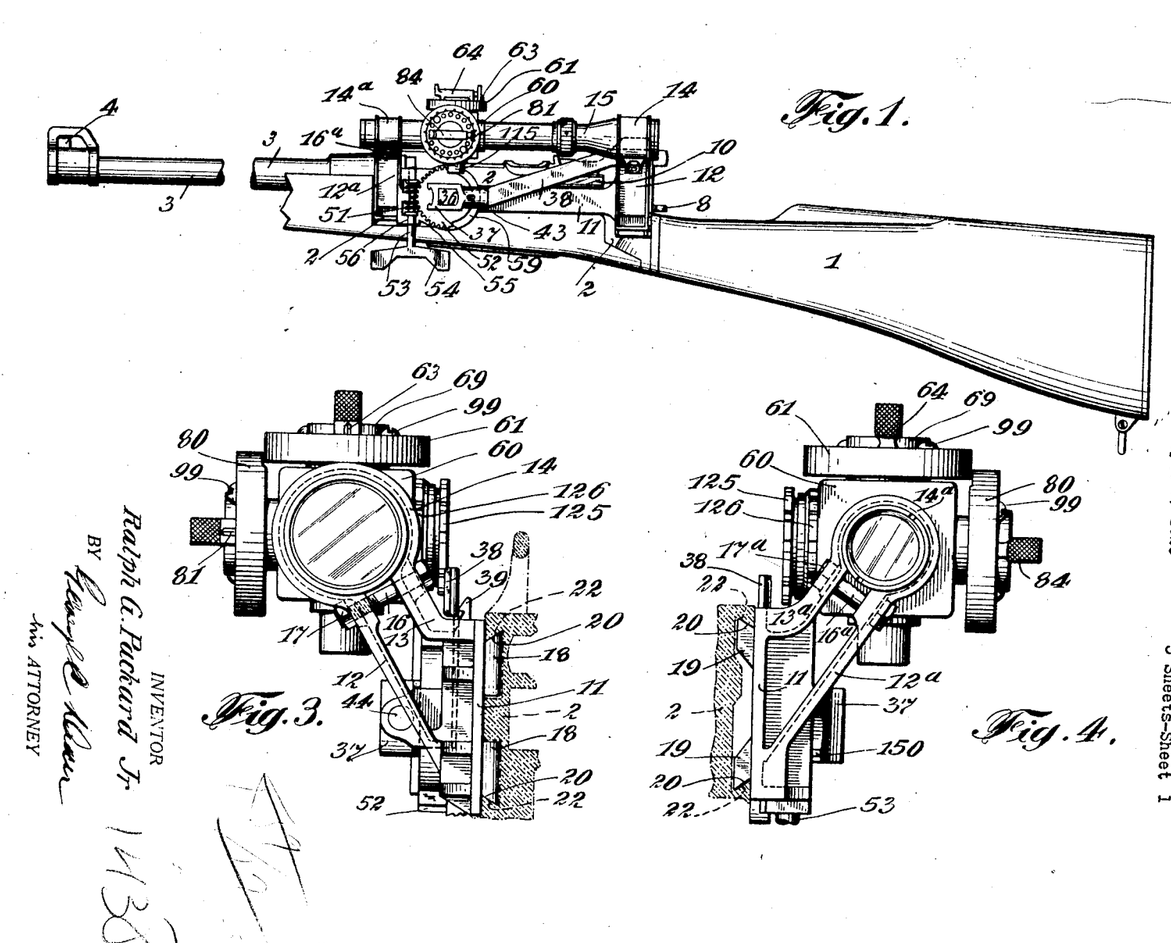
Fig. 1 is a side elevation of the telescope and mount as applied to the left side of a rifle.
Figs. 3 and 4 are respectively rear and front end views of the telescope and mount with the rifle frame shown in shade line section.

In Fig. 1 my telescope sight is shown as applied to a rifle comprising stock 1, receiver frame 2 and barrel 3 provided with the usual iron foresight 4 and rear sight 5. As indicated more clearly in Fig. 2, I have selected for purposes of illustration a gun designed by me which is more fully shown and described in my prior application, Serial No. 565,039, the peculiarities of which are not essential to my present invention and need be mentioned only to the extent of identifying breech bolt 6, operating lever 7, down-pressure safety release 8, down-pressure thumb trigger 9 and bolt releasing member 10. In this particular case the receiver frame, as shown in Fig. 5, is really designed for detachably securing my telescope mount, but it will be evident that the proportions and disposition of the locking elements may be varied to suit the frames of particular guns and it is of course always possible to braze to any gun frame a plate having the desired locking recesses either modified or, if desired, in the exact form shown in the drawings.

Figure 9:
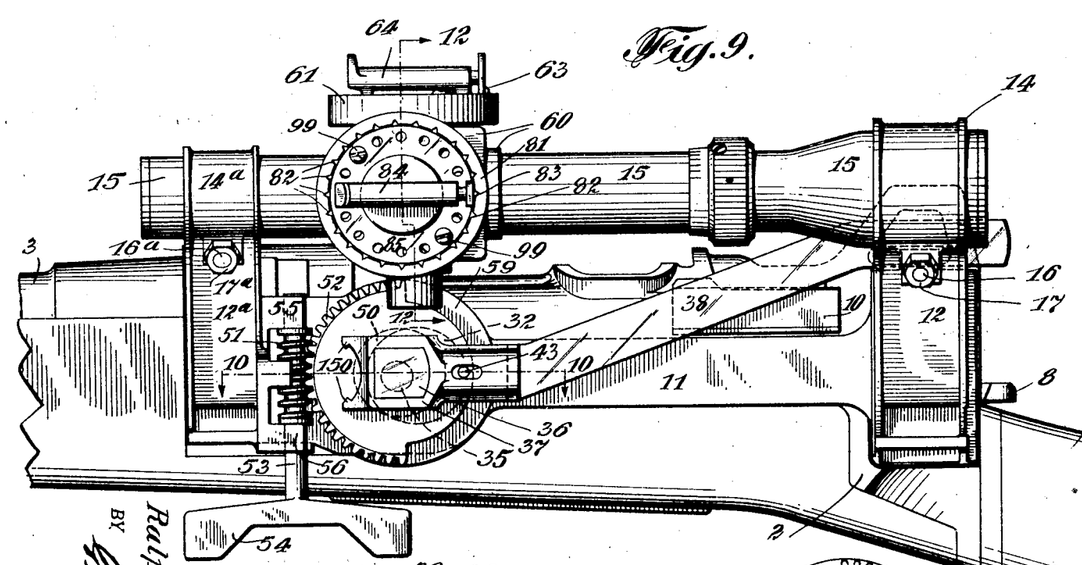
Fig. 9 is a side elevation like Fig. 1, but showing the parts on a larger scale and limiting the view of the gun to the frame and adjacent parts.

As shown in Fig. 1 and, on a larger scale in Fig. 9, the detachable carriage or mount for the telescope comprises a relatively long rigid bar 11, having preferably integral therewith upwardly extending bracket members 12, 13 terminating at their upper ends in a split or segmental ring clamp 14 adapted to encircle the rear end of the telescope tube 15. Screw means, such as a bolt 16 and nut 17, are provided whereby the ring clamp may be tightened upon the telescope tube with almost any desired pressure. Similar brackets, ring clamp and securing means 12a, 13a, 14a, 16a and 17a are arranged at the other end of the bar 11 for similarly clamping the front end of the telescope tube 15.

Figure 5:
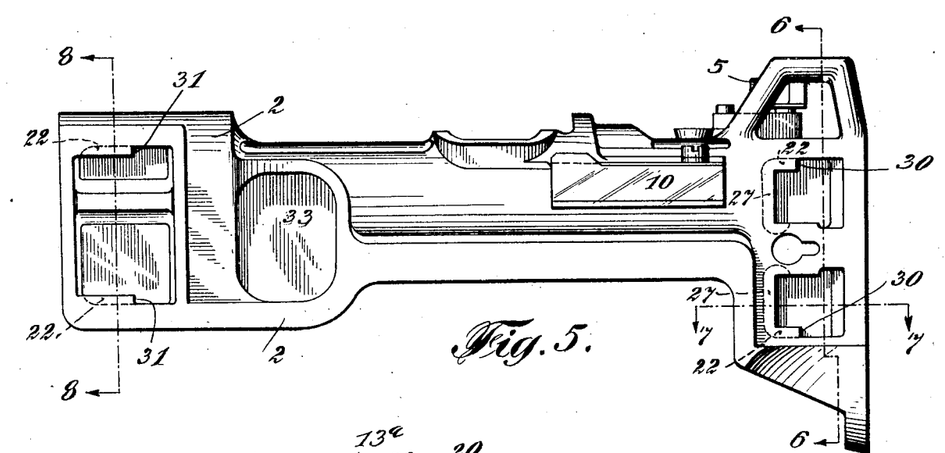
Fig. 5 is a side elevation of the receiver frame showing the recesses for engagement by the telescope mount.
Figure 6:
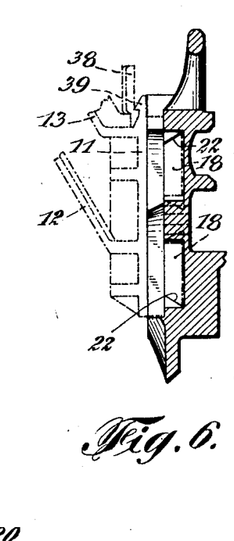
Figs. 6, 7 and 8 are detail sections respectively on the lines 6—6, 7—7 and 8—8 of Fig. 5.
Figure 7:
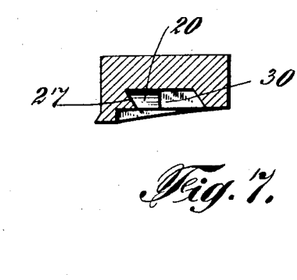
Figure 8:
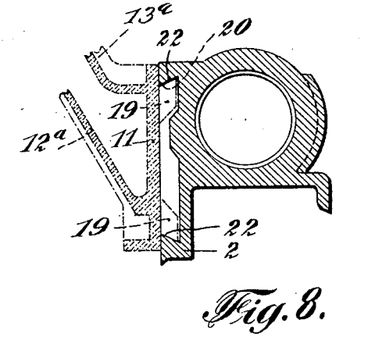

The bar or base 11 is provided on its frame engaging face with pairs of under-cut projections 18, 18 (see Figs. 2 and 3) and 19, 19 (see Fig. 4) adapted to engage under-cut recesses in the frame (see Fig. 5). Preferably the outwardly presented side 20 of each projection is beveled so that they cooperate for dovetail fit and simple sliding engagement with corresponding under-cut surface 22 in the frame. Preferably these surfaces are parallel in the direction of slide so as to wedge only upon outward stress. Inward wedging under endwise stress is effected by providing the lugs 18, 18 with forwardly presented wedge surfaces 26 which abut directly against the transversely disposed wedge surfaces 27, 27, in the frame. The top and bottom under-cut bearing surfaces 20, 22 being simply close fitting slide surfaces preferably parallel with the axis of the barrel, their length of slide is made great enough to permit the transverse wedge surfaces 26, 26 to contact with the transversely disposed wedge surfaces 27 substantially before the forward lugs approach the ends of their slide recesses. The longitudinal slide recesses on the frame are cut away as at 30—30 for the rear lugs and 31—31 for the forward lugs so that said lugs may be laterally applied to and removed from the frame through said cut away portions.

Figure 10:
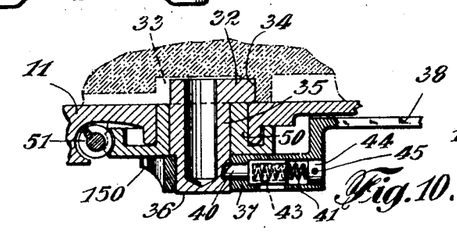
Fig. 10 is a sectional detail on the line 10—10, Fig. 9.
Figure 11:
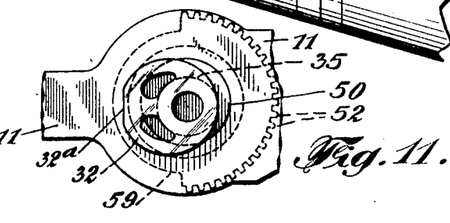
Fig. 11 is an elevation of the detail of Fig. 10 but viewed from the backside of the mount.

Since this preferred design of the locking lugs and recesses causes all forward stress on the mount (rearward stress or recoil of the gun) to take effect solely on wedge surfaces 26, a most rigid locking engagement may be had by very slight forward movement of the telescope mount, as before explained. The means for effecting this movement with maximum power and self-locking security is best seen in Figs. 9, 10 and 11. The locking member that takes the thrust consists of an eccentric 32, which fits recess 33 in the frame (see Fig. 5). This eccentric has a square abutment against the rear wall of its recesses as indicated at 34, so that its thrust is directly parallel with the axis of the gun and therefore with the top and bottom dovetail slides above described. An integral extension 35 extends through the bar 11 and it is formed with a head 36 squared or otherwise formed, as shown in the drawing, for engagement by a wrench head 37 which fits the same very closely. In this particular case the fit is such that the wrench can only be applied to the head in one fixed angular position relative to the throw of the eccentric 32 and the wrench is provided with a long handle 38 adapted to be held in the locking position by detent 39 carried by the rear end of the bar 11. The wrench is normally held locked to the head 36 by latch bolt 40 latched by spring 41. Preferably this latch is arranged to be retracted by inserting the point of the bullet of an ordinary rifle cartridge in the conical recess 43. The latch and the spring are held by plug 44 secured by screw 45.

While the eccentric locking element 32 may have a completely circular periphery, giving line contact with a plane rear surface for recess 33, line contact is not safe for the enormous clamping pressures which I desire to apply. I therefore use the said eccentric merely for setting the slide lugs of the carriage up to approximate ultimate position of their transverse wedging surfaces and provide the eccentric with a flat bearing surface 32a which is parallel with the cooperating bearing surface in recess 33, when the eccentric is locked in its dead center position. Other means for powerfully setting up these surfaces to apply great tension is provided in the form of a rotary bearing 50, which carries eccentrically thereof the pivot shaft 35 of eccentric 32. This rotary bearing is set up by means of a worm 51 engaging a worm segment 52 integral with the periphery of said bearing. This worm is carried by shaft 53 having a wide spread wing handle 54 for turning it. Said shaft 53 is mounted in lugs 55, 56, between which the worm gear fits and against which it thrusts under-screwing and un-screwing efforts. The journals for the shaft are open semi-cylinders so that this worm element may be laterally applied or removed when the peripheral worm gear 52 is out of the way. This may be accomplished by removing the wrench 37 and rotating the worm gear around to bring the blank segment 59 in registry with the worm. Enormous power can be applied through the worm to rotate the eccentric journal and the eccentricity of the latter is so small that this power is again enormously multiplied in its effect upon shaft 35 and the eccentric 32. As the thrust is applied squarely through the flat surface 32a of the eccentric with the latter on a dead center and locked by lever 38 and detent 39, truly enormous pressures can be applied upon the rear wedges 26, and great strain set up without danger of marring or deforming the steel thrust surfaces.

By reason of the overhung position of the flat 32 any minute looseness or play in its bearings tends to take effect as an outward pivotal movement about rear wedges 26 as a center, thus wedging outward the forward dovetail surfaces 20, 22. These as well as the transverse wedge surfaces 26, 27 are so blunt, that is, of such high pitch that they cannot stick against unlocking no matter how powerfully they are set up.

By the above means the telescope and mount become practically integral with the frame of the rifle, with the added advantage which integral construction would not add, namely, that the metal parts which are to take the strain of gun recoil versus telescope inertia, are all stretched so that even minute elastic yield is eliminated. Hence there is only the elasticity of the brackets and these, as will be seen, are extremely massive from rear to front which is the line of the recoil-inertia stress.

Figure 2:
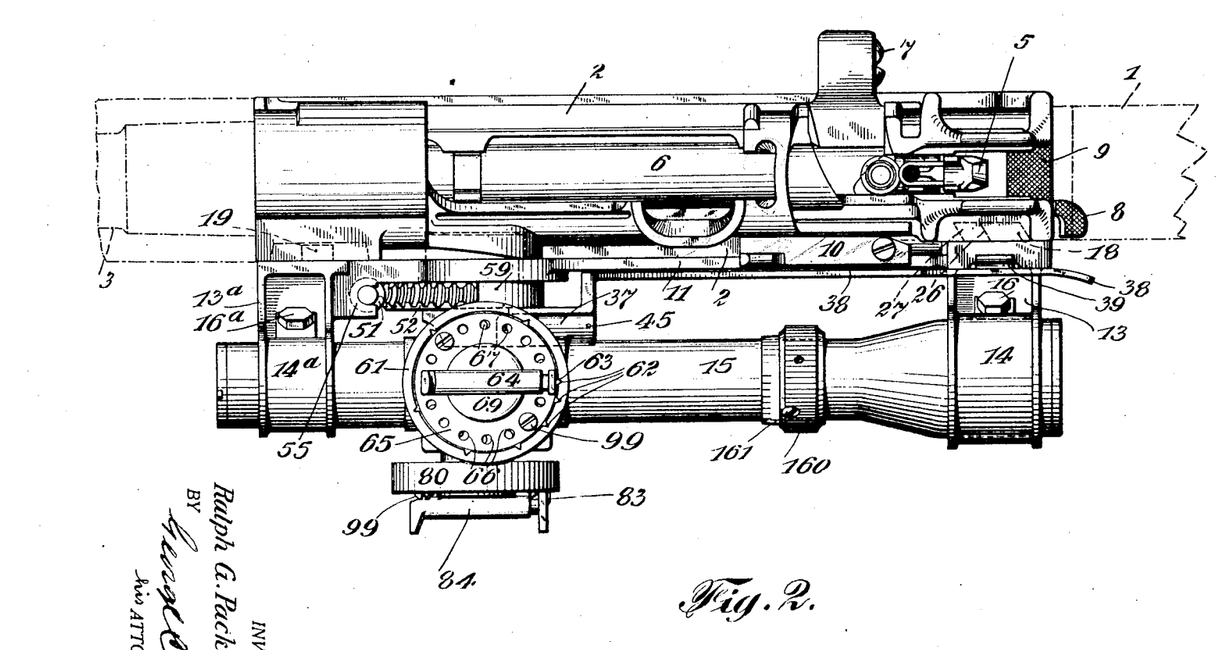
Fig. 2 is an enlarged plan view of the telescope and mount in position on the frame of the rifle.

It will be noted that the telescope is thus a removable but functionally integral part of the rifle frame, which can be removed and replaced but which cannot be adjusted either for elevation or lateral deflection. While vertically adjustable sights within the telescope offer no particular problem and are well known, it is obvious that for careful, accurate shooting which the necessity for a telescope pre-supposes, windage adjustment at the will of the user is highly desirable and some form of adjustable or permanent accommodation for zeroing and drift of the bullet is absolutely essential. Heretofore this has been taken care of either by troublesome shaping of the original mount to correct errors for zeroing, with no provision for windage or drift adjustment, or else windage and drift have been taken care of by providing a supplemental carriage between a telescope and its mount. Such a supplemental carriage, with its unavoidably insecure adjustment and adjustment locking means, it is one of the objects of my invention to avoid. This I have accomplished by transferring the deflection adjustment from the exterior mount to the sighting reticule within the telescope. This involves difficulties which I believe I am the first to solve. Referring to Figs. 1 and 2, it will be seen that the telescope barrel is divided (see Figs. 13 and 14) and a tubular frame segment 60 is inserted. This carries an upper casing 61, the top of which is provided with a range scale indicated by notches 62 (see Fig. 2) adapted to be laterally engaged by spring detent 63 housed in hand rotatable barrel 64 carried by a ring disc 65 having (see Fig. 12) a series of evenly spaced perforations 66 in vernier relation to a series of holes 67 in an underlying portion 68 of head 69 of vertical adjusting screw 70.

There is a precisely similar external means for lateral adjustment, comprising the circular case 81 with notches 82, detent 83, hand-piece 84, vernier ring 85 supported on the annulus 88 having cooperating vernier holes, and integral with lateral adjusting screw 90. In the latter device the detent construction of both devices is clearly indicated as supported by a head 91 carried by a shank 92 sliding in the hand-piece 84 and backed by spring 93.

Both casings 61 and 81 are provided with drainage holes 95 as shown and they are integral with internally threaded barrels 97 in which are adjustably mounted the screws 70 and 90 respectively. The detent plate 65 is secured to its support annulus 68 in practically any desired angular relation by means of screws 99, 99, and the annulus 85 is similarly secured by screws 99, 99.

As shown best in Figs. 12 to 15, within the barrel section 60 is fitted a piece 100 formed on its front face with vertically extending dovetail slides 101 adapted to be engaged by a cooperating dovetail surface 102 on a primary carriage 103 which is in turn provided with transverse dovetail slides 104 adapted to be engaged by the corresponding dovetail 105 on the secondary carriage 106. The latter carriage is centrally formed with the sighting reticule including a circular pasage 107 into which project the lateral sighting posts 108 and the vertical sighting post 109.

One end surface of secondary carriage 106 has sliding engagement with transverse adjusting screw 90 against which it is forced by a spring 110 anchored by centering pin 111 which is integral with the primary carriage 103. The primary carriage is depressed vertically along the slideway 101 by means of the vertical screw 70 and is powerfully spring-pressed in the upward direction by spring 113 anchored on pin 114 in cup 115 which is screw-threaded in section 60 as shown. The other end of spring 113 is centered on the primary carriage by a pin on the latter.

The segmental piece 100, which supports the slide, is formed outwardly as a segment of a cylinder and there is a cooperating cylindrical segment 120 the edges of which 121 fit rabbets 122 in said piece 100 so as to form therewith a complete cylinder. This cylinder accurately fits casing 60 and its proper angular position therein is assured by key pins 112 on the end of segmental piece 100.

Figure 13:
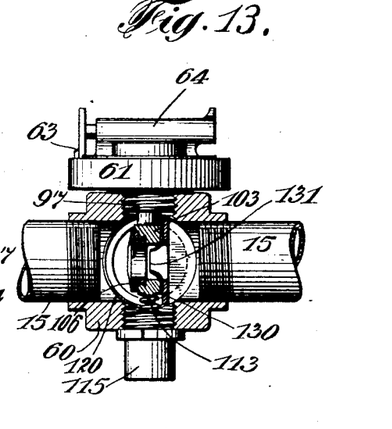
Figs. 13 and 14 are detail sections on the lines 13—13 and 14—14 respectively of Fig. 12.
Figures 14, 15:
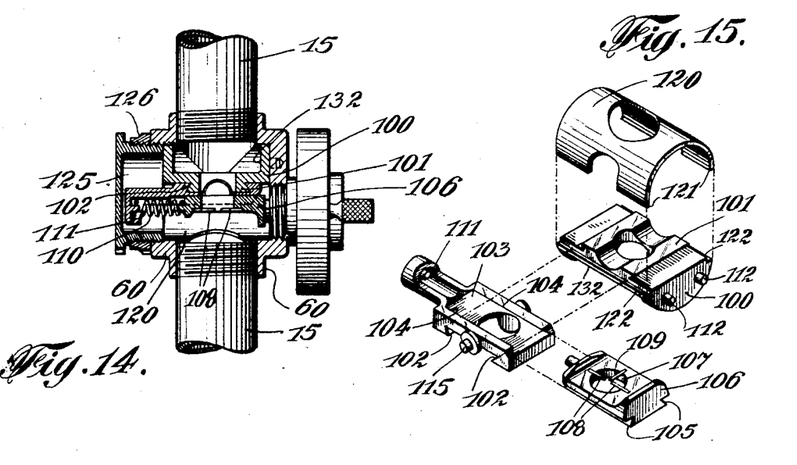
Fig. 15 shows the parts constituting the sighting reticule and a mounting therefor within the telescope with dotted lines indicating their assembly relations.

As indicated in Fig. 15, the secondary carriage 106 may be slid into the ways 104 on primary carriage 103; with spring 110 in position thereon, the primary carriage may then be slid into engagement with the ways 101 and the cylinder piece 120 applied. The parts thus assembled may then be slid endwise into the casing of barrel 60, from the lefthand end (Fig. 12) and there tightly clamped by means of screw cap 125 secured by lock nut 126. Spring 113 may then be assembled in cup 115 and the latter screwed in position through the bottom of 60. If desired, a diaphragm 130 (Fig. 13) having a central cone leading to circular aperture 131 may be inserted in the recess 132 which is formed by cutting away a portion of the back of the slide piece 100.

With this arrangement for independent lateral and vertical adjustment of the sighting reticule, in combination with the first above described method for accurately locking the telescope in immovable relation to the frame of the gun, it is only necessary to have the axis of the telescope reasonably near parallel with the axis of the barrel, the important thing being that the position assumed is substantially the same every time the telescope is removed and replaced.

These conditions being fulfilled and the sight being rigidly in place on the gun, a very fine adjustment for zeroing of the rifle may be had by repeated shots with trial adjustments of the thumb piece 84 until the sights are correct for lateral alignment. Then the screws 99 may be removed and the hand-piece placed with the detent 83 in the desired zero notch, in which position the vernier arrangement of the screw holes above described will result in having two of the holes in substantial alignment and through these holes the screws 99 may be inserted and screwed home. The rifle being thus permanently zeroed for lateral alignment, any desired subsequent lateral adjustments for windage and drift, may be made by merely rotating the hand-piece 84 one or more notches. These index notches are preferably equally spaced so that each notch means an equal number of inches lateral adjustment for each given range.

The zeroing and adjustment of the rifle for range is accomplished in precisely the same way except the screw 70 and hand-piece 64 are the rotatable elements. In this case, however, each notch corresponds to a correct elevation for one particular range. Hence these notches are not equidistant, but the precise position of each notch may be predetermined for a standard cartridge and rifle. Then the zeroing may be effected for each individual rifle by trial shots, adjustments and resetting of the vernier for the ascertained zero, as in the case of the lateral adjustment described above.

Theoretically considered, my vernier arrangement of screw holes does not admit of locking the index to the adjusting screw precisely at every possible angle but with holes as large as one-eighth inch we may have say 20 holes in the screw head series for say 16 holes in the index annulus and, with two holes matching, the error will be only one eightieth of a revolution of the adjusting screw $\frac{1}{(16 \times 5)}$ and as the thread of this screw is preferably fine, the resulting error in zeroing is likely to be less than the error due to variations in ammunition and inaccuracies of the observer in trial targeting. This vernier arrangement for zeroing will be found useful on any screw that is used for adjusting any kind of a rifle sight.

Figure 12:
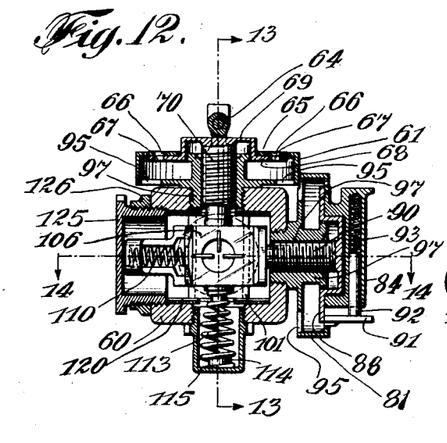
Fig. 12 is a section through the telescope and sighting reticule on the line 12—12, Fig. 9.

By reference to Figs. 12, 13 and 14 it will be seen that all openings in the reticule casing 60 are sealed water-tight and dust-tight by screw means that can be accurately fitted. The screw joints for screwing the telescope tube sections can be permanently brazed if desired. The bushings which carry the stationary scales and adjusting screws are provided with ample clamping shoulders that may be set up as tightly as desired. The same thing is true of the casing 115 for spring 113. The closing cap 125 is provided with a locking ring 126, which may also be set up as tightly as desired. A convenient means for this is provided in the form of the spanner projections 150, 150, on wrench-head 37. This leaves only the screws 70 and 90 and these are formed with long shanks and fine threads accurately fitting the screw threaded passages. The springs 110 and 113 respectively force these threads into continuous one-direction engagement, thus tending to make them tight against water and dust, as well as taking up any trace of back-lash. Moreover, the heads of the screws are in cup form, closing and substantially protecting these screw threads against access of water by any exposure short of complete submersion. In this way I have succeeded in making the sight reticule laterally as well as vertically adjustable while maintaining the interior of the telescope substantially dust-tight and water-tight.

A further important feature is that the sighting reticule and the mount therefor may be instantly removed from or replaced in the casing without the use of any special tools, the spanner on the wrench-head and the bullet or other pointed instrument being all that is necessary even in case all of the screws are set up under extreme stress.

While the telescope may be of the focusing type, I prefer to use the universal focus type which can be permanently secured by the clamps 14, 14ᵃ. Usually, however, even the latter type require some focusing to bring the cross hairs or sighting points into sharp focus for the eye of the user. This feature, however, does not particularly concern my present invention and I have therefore merely indicated at 160 a well known type of rotatable adjustment ring for longitudinally adjusting the inverting lenses by means not shown. This ring is secured in desired position of adjustment by lock screw 161.

For the sake of clearness, I have shown and described the wedge hooks, that is, the forwardly directed wedge surfaces 26, 27 at the rear of the mount as being exactly transverse to the axis of the barrel and the surfaces 20, 22 as being exactly parallel therewith. It will be evident, however, that the essential condition is that these surfaces be free from small angle convergence in the direction of the great stress set up by the locking eccentric 32 and its eccentric journal 50. Such small angle convergence is practically universal in prior removable mounts and in all of them this feature renders devices practically inoperative because when the necessary great stress is applied to force small angle convergence, the steel can easily be forced into such intimate engagement that removal of the mount requires, at the best, powerful blows of the mallet and at the worst it may even be that the mount is locked beyond possibility of removal except by violence that will destroy it. Hence it is the essence of my invention, not that the wedge surfaces 26, 27 are absolutely transverse, but rather that the effected pitch of the wedges in the direction of the locking strain is a high angle preferably greater than the angle of slip of the surfaces.

Even so, under certain conditions the wedge surfaces may tend to stick, but I provide for breaking the stick contact by making the recesses 33 of such size that the eccentric 32 will wedge against the forward end thereof when the lever 38 rotates it to the unlocked position. This leaves the mount loose in the hands of the operator.

One important reason why the forward longitudinal dovetails 20, 22 do not have to be longitudinally wedging is that the area of the flat 34 on eccentric 32 is so great and the pressure applied through it is so powerful and its distance from the surfaces 26, 27 is so great that the mount is held in position at the forward end with great security, even independently of the forward dovetails 20, 22.

I claim:

1. A gun comprising barrel, stock and firing mechanism in combination with two sets of sighting means designed for optional use, secured to the gun, one in approximate alignment with one eye and the other in approximate alignment with the other eye when the cheek of the user is in normal position of rest against the stock in the firing position, one of said sets comprising a non-telescopic front and rear sight aligned in the medial plane above the barrel and the other being a telescope offset from the rear sight a distance approximately equal to the distance between the eyes of the user.

2. A gun comprising barrel, stock and firing mechanism including breach bolt, firing plunger and cocking piece in combination with two sets of sighting means designed for optional use, secured to the gun, one in approximate alignment with one eye and the other in approximate alignment with the other eye when the cheek of the user is in normal position of rest against the stock in the firing position, one of said sets including a peep sight on the cocking piece of the firing plunger aligned for sighting along a medial plane above the barrel and the other set being embodied in a telescope secured to the side of the gun with its line of sight on approximately the level with that of the same peep sight, and the rear end of the telescope being located near the same transverse plane with the peep sight.

3. A gun comprising barrel, stock and locking mechanism in combination with two sets of sights secured to the gun, one in approximate alignment with one eye and the other in approximate alignment with the other eye when the cheek of the user is in normal position of rest against the stock in the firing position, one of said sets being non-telescopic front and rear sights aligned in a medial plane above the barrel and the other being a telescope rigidly and non-adjustably secured to the gun, offset on the left side of the gun, a distance approximately equal to the distance between the eyes of the user; said telescope having an interior sight reticule and means for adjusting said reticule both horizontally and vertically.

4. A gun comprising barrel, stock and locking mechanism including breach bolt, firing plunger and cocking piece in combination with two sets of sights secured to the gun, one in approximate alignment with one eye and the other in approximate alignment with the other eye when the cheek of the user is in normal position of rest against the stock in the firing position, one of said sets including a peep sight on the cocking piece of the firing plunger aligned for sighting along a medial plane above the barrel and the other set being embodied in a telescope non-adjustably secured to the left side of the gun with its line of sight on approximately the same level with the peep sight, and the rear end of the telescope being located near the same transverse plane with the peep sight; said telescope having an interior sight reticule and means for adjusting said reticule both for elevation and for deflection.

5. A gun including barrel, frame, stock and firing mechanism, in combination with a sighting telescope and means for detachably mounting it on the gun, including a rigid bar or frame member having an under-cut wedging surface extending vertically at right angles to the axis of the barrel and a dovetail extending lengthwise of said axis, both fitting correspondingly shaped recesses on the frame, in combination with a rotating cam member fitting with and bearing upon a thrust surface of a recess on the frame and power multiplying means for rotating said cam to force said bar member along said dovetail and said vertically extending wedging surfaces into intimate engagement with the corresponding wedge recesses on the frame.

6. A gun including barrel, frame, stock and firing mechanism, in combination with a sighting telescope and means for detachably mounting it on the gun, including a rigid bar or frame member having an under-cut wedging surface extending vertically at right angles to the axis of the barrel and a dove-tail extending lengthwise of said axis, both fitting correspondingly shaped recesses on the frame, in combination with a rotating cam member fitting with and bearing upon a thrust surface of a recess on the frame and power multiplying means for rotating said cam to force said bar member along said dovetail and said vertically extending wedging surfaces into intimate engagement with the corresponding wedge recesses on the frame; said cam being approximately circular but having a flat bearing surface at the point of contact when in the locking position and means for bodily moving the cam to force said flat into rigid abutment against said thrust surface.

7. A gun including barrel, frame, stock and firing mechanism, in combination with a sighting telescope and means for detachably mounting it on the gun, including a rigid bar or frame member having an under-cut wedging surface extending vertically at right angles to the axis of the barrel and a dove-tail extending lengthwise of said axis, both fitting correspondingly shaped recesses on the frame, in combination with a rotating cam member fitting with and bearing upon a thrust surface of a recess on the frame and power multiplying means for rotating said cam to force said bar member along said dove-tail and said vertically extending wedging surfaces into intimate engagement with the corresponding wedge recesses on the frame; said cam being approximately circular but having a flat bearing surface at the point of contact when in the locking position and means for bodily moving the cam to force said flat into rigid abutment against said thrust surface, said latter means including a rotatable eccentric in which said cam is journalled.

8. A gun including barrel, frame, stock and firing mechanism, in combination with a sighting telescope and means for detachably mounting it on the gun, including a rigid bar or frame member having a forwardly presented under-cut wedging surface extending at right angles to the axis of the barrel and a dovetail parallel with said axis, both fitting correspondingly shaped recesses on the frame, in combination with a rotating cam member fitting into and bearing against the rear wall of a recess on the frame; and power multiplying means for rotating said cam to force said bar member forwardly along said dovetail and said forwardly directed wedging surfaces into intimate engagement with the corresponding wedge recesses on the frame, said cam being approximately circular but having a flat bearing surface at the point of contact when in the locking position and means for bodily moving the cam to force said flat into rigid abutment against the rear wall of its recess; said latter means including a rotatable eccentric in which said cam is journalled, and a worm gear for rotating said eccentric journal.

9. A gun including barrel, frame, stock and firing mechanism in combination with a sighting telescope and means for detachably mounting it on the gun, including a rigid bar or frame member having an under-cut wedging surface extending at right angles to the axis of the barrel and a dovetail extending lengthwise of said axis, both fitting correspondingly shaped recesses on the frame, in combination with locking wedge means for forcing said bar member along said dovetail and said wedging surfaces into direct intimate engagement with the corresponding wedge recesses on the frame.

10. A gun including barrel, frame, stock and firing mechanism in combination with a sighting telescope and means for detachably mounting it on the gun, including a rigid bar or frame member having an under-cut wedging surface extending at right angles to the axis of the barrel and a dovetail extending lengthwise of said axis, both fitting correspondingly shaped recesses on the frame, in combination with low pitch rotary wedging means and a rotating and locking screw for rotating said low pitch rotary wedging means to force said bar member along said dovetail and said wedging surfaces into intimate engagement with the corresponding wedge recesses on the frame.

11. A telescopic gun sight, including a telescope and a carriage therefor including rigid telescope clamps and means for immovably locking the mount to the gun including under-cut wedge surfaces on the mount and corresponding under-cut wedge surfaces on the gun, said wedging surfaces being arranged to wedge by relative movement longitudinally, in the direction of recoil and counter-recoil, in combination with power multiplying wedging means for stressing said wedging surfaces towards wedging engagement.

12. A telescopic gun sight, including a telescope and a carriage therefor including rigid telescope clamps and means for immovably locking the mount to the gun including under-cut wedge surfaces on the mount and corresponding under-cut wedge surface on the gun and power multiplying wedging means for stressing said wedging surfaces towards wedging engagement and means for further engaging the parts with great stress including a rotary journal in which said wedging means is eccentrically mounted and means for rotating said journal.

13. A telescopic gun sight, including a telescope and a carriage therefor including rigid telescope clamps and means for immovably locking the mount to the gun including cooperating bearing and under-cut wedging surfaces on the gun, engaged by corresponding bearing and wedging surfaces on the mount, the wedging surfaces on the gun being rearwardly presented so that the wedging is by stress in the direction of recoil of the gun, in combination with wedge locking means applying thrust in a plane approximately at right angles to said wedging surfaces to force them directly into intimate wedging engagement.

14. A telescopic gun sight, including a telescope and a carriage therefor including rigid telescope clamps and means for immovably locking the mount to the gun including under-cut wedge surfaces on the mount and corresponding under-cut wedge surfaces on the gun and power multiplying wedging means for stressing said wedging surfaces towards wedging engagement and means for further forcing the cam including a rotary journal in which said cam is eccentrically mounted and means for rotating said journal; said under-cut wedge surfaces being forwardly directed to sustain the inertia thrust of the mount when the gun is fired and the initial clamping pressure of the cam forcing means being great as compared with the maximum inertia thrust.

15. A telescopic gun sight, including a telescope and a mount therefor including rigid telescope clamps and means for immovably locking the mount to the gun including under-cut wedge surfaces on the mount and corresponding under-cut wedge surfaces on the gun and a cam of low pitch and a lever for rotating the cam to feed said wedging surfaces into proximate engagement; and means for further forcing the cam including a rotary journal in which said cam is eccentrically mounted and means for rotating said journal; said under-cut wedge surfaces being forwardly directed to sustain the inertia thrust of the mount when the gun is fired and the initial clamping pressure of the cam forcing means being great as compared with the maximum inertia thrust.

16. A sighting telescope and means for rigidly and non-adjustably fixing the telescope on a gun with its axis in approximate parallelism with the axis of the gun barrel, in combination with a sighting reticule within the telescope tube and means for adjusting said reticule with respect to the telescope, vertically for elevation and transversely for windage or drift, said means including vertical and transverse screws each having an exterior head rigid therewith and an indexing head rotatably secured to said screw head in operative relation to a stationary sight-adjustment scale, said indexing head being secured to said screw head in desired zeroed relation by locking screws engaging circularly arranged recesses in vernier relation, in said member and head respectively.

17. A sighting telescope having a sighting reticule within the telescope tube and means for adjusting said reticule with respect to the telescope, said means including a screw having an exterior head rigid therewith and a supplemental indexing member secured to said head in operative relation to a stationary sight-adjustment scale, said indexing member being positively locked to said head in desired zeroed relation by two sets of circularly arranged screw holes in vernier relation, in said member and head respectively, and screw locking means engaging registering holes of the respective sets.

18. A sighting telescope having a sighting reticule within the telescope tube and means for adjusting said reticule with respect to the telescope, said means including a screw having an exterior head rigid therewith and a supplemental indexing member secured to said head in operative relation to a stationary sight-adjustment scale, said indexing member being positively locked to said head in desired zeroed relation by two sets of circularly arranged screw holes in vernier relation, in said member and head respectively, so that two diametrically opposite holes of each series are in proximate registry in all angular positions and a screw engaging each pair of registering holes and clamping said member and said head in fixed relation.

19. A gun sight and a screw for adjusting it, said screw having a head in operative relation to a stationary adjustment scale and means whereby the screw may be zeroed in any desired position of adjustment, said means including an index plate which can be rotated to the scale zero without rotating the screw; and means for positively locking the screw head and said index member in said zero position, including clamping screws and two series of screw holes in said member and in said head respectively, in vernier relation, the clamping screws being secured through registering holes of the two series.

20. In combination, a gun sight, a screw for zeroing and for field adjustments of said sight, a member on the screw to turn the same, and a second member adjacent which the first mentioned member moves, one of said members having an index and the other having a scale to indicate the field adjustments of the screw from zeroed position, and the member on the screw being adjustable thereon to enable it to be shifted to zero indication after the zeroing adjustment without shifting the screw.

21. In combination, a gun sight, a screw for zeroing and for field adjustments of said sight, a member on the screw to turn the same, a second member adjacent which the first mentioned member moves, one of said members having an index and the other having a scale to indicate the field adjustments of the screw from zeroed position, and the member on the screw being adjustable thereon to enable it to be shifted to zero indication after the zeroing adjustment without shifting the screw, and detent means for detaining the screw in different positions of adjustment.

22. In combination, a gun sight, a screw for zeroing and for field adjustments of said sight, a member on the head of the screw to turn the same, and a second member adjacent which the first mentioned member moves, one of said members having an index and the other having a scale to indicate the field adjustments of the screw from zeroed position and the member on the head of the screw being adjustable thereon to enable it to be shifted to zero indication, after zeroing adjustment, without shifting the screw, and means for securing the first mentioned member to the head of the screw in desired zeroed relation, said securing means including sets of cooperative elements, circularly arranged in vernier relation, in such member and head respectively.

Signed at New York city in the county of New York and State of New York this 7th day of September, A. D. 1923.

RALPH G. PACKARD, Jr.